A. SEIMAN.
AUTOMATIC FARE INDICATOR FOR HIRE OR OTHER VEHICLES.
APPLICATION FILED JULY 28, 1908.

912,899.

Patented Feb. 16, 1909.
5 SHEETS—SHEET 1.

Witnesses.
Jas. E. Dodge
W. Max Duvall

Inventor
Alfred Seiman
By Wilkinson, Fisher & Witherspoon
Attorneys.

A. SEIMAN.
AUTOMATIC FARE INDICATOR FOR HIRE OR OTHER VEHICLES.
APPLICATION FILED JULY 28, 1908.

912,899.

Patented Feb. 16, 1909.
5 SHEETS—SHEET 4.

A. SEIMAN.
AUTOMATIC FARE INDICATOR FOR HIRE OR OTHER VEHICLES.
APPLICATION FILED JULY 28, 1908.

912,899.

Patented Feb. 16, 1909.
5 SHEETS—SHEET 5.

Witnesses.
Jas. E. Dodge.
W. May. Durrall.

Inventor.
Alfred Seiman.
By Wilkinson, Fisher & Witherspoon,
Attorneys.

UNITED STATES PATENT OFFICE.

ALFRED SEIMAN, OF PARIS, FRANCE, ASSIGNOR TO JOSEPH LOUIS MYERS, OF PARIS, FRANCE.

AUTOMATIC FARE-INDICATOR FOR HIRE OR OTHER VEHICLES.

No. 912,899.   Specification of Letters Patent.   Patented Feb. 16, 1909.

Application filed July 28, 1908. Serial No. 445,837.

*To all whom it may concern:*

Be it known that I, ALFRED SEIMAN, a subject of the King of Roumania, residing at 72 Boulevard St. Marcel, Paris, France, engineer, have invented a new and useful Automatic Fare-Indicator for Hire or Other Vehicles, of which the following is a specification.

My invention relates to improvements in automatic fare indicators for hire or other vehicles, of the kind commonly known to the public as "taximeters" and for the purpose of visibly registering to a passenger the fare due for the hire of the vehicle according to the time or distance.

As usual this apparatus is mounted within easy reach of the driver, close to or on the driver's seat, and within reading distance from the passenger to whom it presents a plate or dial on which the fare is registered in accordance with the time for which the vehicle may have been hired. The setting of the apparatus is effected by the driver by means of a handle or lever usually carrying or connected with a plate or flag marked "For hire" or otherwise, and so attached to the operative parts of the apparatus as to set the latter at an initial fee, varying according to the time of day and number of persons to be carried by the vehicle. The working mechanism is driven by the wheels of the vehicle, and it is inclosed in a housing so as to be inaccessible to the driver or to any other person except the one authorized by the particular carriage concern, or to the owner of the vehicle, in order to exclude any unfair manipulation. It is moreover and by preference provided with a totalizer or recorder, automatically registering the total number of hires or fares within a given time, and constructed and operating in any known or appropriate manner. The mechanism is one working on the horo-kilometric system and it is accordingly and constantly controlled by a suitable clockwork.

According to my invention the characteristic feature of the apparatus consists in the arrangement of a setting shaft which is connected on the one hand with the knob or handle by means of which the registering mechanism may be set to the starting position and restored to the initial position, and on the other hand with the member positively driven by the wheels of the vehicle. The said shaft moreover carries a gear constantly engaging with the clockwork, and a transmitting gear capable of being thrown in and out of engagement with the registering mechanism, and a clutch so interposed between the said parts and the shaft that all of the driving parts are automatically coupled to coöperative position by the setting of the shaft to the starting or uncoupled by the restoring of the shaft to the zero position. On so being coupled the mechanism does not commence to register until a distance or its equivalent of time corresponding to the initial fee at which the instrument has been set, is spent, to which end a notch of a determined extent is provided in the transmitting gear causing a corresponding lost motion or idle running of the parts.

Another important feature of my invention is the construction of the gear transmitting motion to the registering device. It is composed of a pair of pin wheels having a twofold engagement and thereby coöperating in a manner to produce a periodical or intermittent action, which is assisted by a spring actuated pawl, whereby the periods of the engagement are rendered more sudden and definite, for the purpose of producing the change of the figures on the counting wheels at the moments at which they are to appear on the indicating face of the instrument, more swift and apparent.

Moreover the apparatus comprises a very simple and effective connection of the operative handle or shaft and of the board or flag indicating whether the apparatus is free for hire or not, and other various details of construction, as will clearly appear from the description with reference to the accompanying drawings in which:

Fig. 14. is a lateral view of the pawl controlling the movement of the pin wheels. Fig. 15. is a section on the line 15—15 of Fig. 4 and Fig. 16. shows a front elevation of the coöperative parts located immediately behind and serving for the movement of the counting wheels.

The whole of the mechanism is inclosed in a housing A, which consists preferably of two parts. The upper part $A^1$, is provided with a front wall $A^2$, two lateral walls $A^3$, and an upper wall $A^4$, which constitutes the top of the housing. The front wall $A^2$, has suitable recesses or slots $A^5$, $A^6$, through which the indications of the apparatus are, in the usual manner, exposed to the passenger, and which are by preference closed by glass plates or other transparent material. The other part of the housing is constituted by the back plate $A^7$, and by the base plate $A^8$.

The mechanism of the apparatus is mounted partly on the base plate $A^8$, and partly on the back plate $A^7$, in such a manner that the part $A^1$, of the housing can be easily removed or put in place without necessitating any essential dismounting or disconnection of the mechanism proper.

Journaled in brackets B, secured to the top $A^4$, of the housing is a shaft $B^1$, to which is secured between the brackets B, a roller $B^2$, carrying an inscription such as "For hire", or the like, which is visible through one of the recesses $A^5$, in the front face $A^2$, of the housing when the apparatus is at rest, and another inscription such as "Hired" or "Horokilometric" if the mechanism is set for operation.

Secured to one end of the shaft $B^1$, so as to lie externally of the housing is an arm $B^3$, to which is attached the signboard or flag $B^4$, carrying the usual inscription and adapted to indicate to the operator at a distance whether the vehicle is free or on hire by being either in a raised or lowered position. The other end of the shaft $B^1$, carries a crank $B^5$, to which is attached a connecting rod $B^6$, the other end of which is connected to or embraces a pin $B^7$, fast and eccentrically arranged on a disk $B^8$, rotatably journaled on a pin $B^9$, on that inner wall $A^3$, of the housing which is opposite to the lateral wall in which the signboard or flag $B^4$, is journaled. The disk $B^8$, is provided with an enlarged portion or sector $B^9$, which coöperates with a pin $B^{10}$, of an arm $B^{11}$, or other member fast on the corresponding end of the setting shaft of the mechanism, whereby on the apparatus being set at starting position the signboard or flag $B^4$, is, by means of the connection just described, automatically turned into a lowered position, while upon the apparatus being reset to zero position the flag $B^4$, is brought back to initial position indicated in Figs. 1, 2, 3 and 5 of the drawing. It will thus be seen that the part $A^1$, of the housing and the mechanism just described is absolutely self-contained, and the connection of the parts for operating the signboard or flag $B^4$, is effected by merely slipping the part $A^1$, over the other part of the housing, as will be clearly understood.

Journaled in brackets $C^1$, $C^2$, attached to the rear wall $A^7$ of the housing or otherwise to the frame work is a shaft C which is the setting shaft of the apparatus. This shaft extends longitudinally through the housing and is provided with a square end portion $C^3$, which terminates short of the adjacent side wall $A^3$, of the housing, and is adapted to receive the inner end $D^1$, of a knob or handle D by means of which the shaft can receive a limited rocking movement in one or other direction for the setting or resetting of the apparatus, as will be hereinafter described. Said lateral wall $A^3$, of the housing is provided with a circular opening $D^2$, through which the tubular end $D^1$, of the knob D can be introduced and slipped over the square portion $C^3$, of the shaft C. Adjacent to the outer face of the said wall $A^3$, and forming part of the knob D is a collar $D^3$, which carries a pin $D^4$, adapted to enter any one of two openings $D^5$, so disposed in the corresponding wall $A^3$, of the housing as to hold the knob D in one or the other of two positions at which it has been set by the operator.

The square end $C^3$, of the shaft C is provided with a threaded bore $C^4$, (Fig. 9.) adapted to receive the threaded end of a pin E which can be introduced through a bore $D^6$, of the knob after the latter has been slipped over the end of the shaft C. This pin E is provided with a head $E^1$, and the knob D has a cavity $D^7$, into which the head $E^1$, of the pin E enters when the latter is screwed into the shaft C. A coil spring $E^2$, is interposed between the inner face of the head $E^1$, and the opposite wall of the cavity $D^7$. The knob D is moreover provided with a disk $D^8$, which can be screwed into the knob so as to close the cavity $D^7$, after the pin E has been introduced. Thus it will be seen that by screwing the pin E into the end $C^3$, of the shaft C, the knob D is secured in its position and can only be detached after the removal of the plate $D^8$, and after the withdrawal of the pin E. The spring $E^2$, tends to constantly press the knob D against the adjacent wall $A^3$, of the housing, thereby forcing the pin $D^4$, into one or the other opening provided therein. Thus if it is desired to turn the knob D, the operator must first exert a pull thereon against the action of the spring $E^2$, in order to withdraw the pin $D^4$, from the corresponding hole, after which the knob is free to be turned in one or other direction, as already stated.

Figure 8:
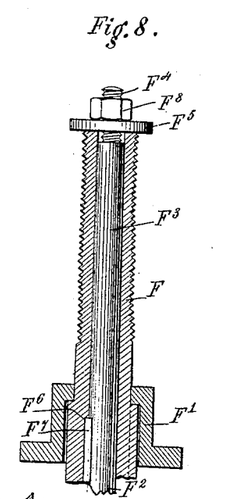
Fig. 8. is a detail showing in section, on an enlarged scale, the mode of connecting the endless screw or worm with the cable usually attached to the driving wheels of the vehicle.

Rotatably journaled in the base plate $A^8$, in any suitable manner, such as for instance by means of a socket $F^1$, secured to the base plate is an endless screw or worm F, to which rotation is imparted from the wheels of the vehicle by a cable $F^2$, (Fig. 8,) or by any other known driving means. Attached to this end of the cable or integral therewith is a barrel $F^3$, the end $F^4$, of which is screw threaded, and which is so introduced into the worm F that its upper end $F^4$, projects beyond the latter, and beyond a bracket $F^5$, which serves as the upper bearing of the worm F. The lower end of the worm F is provided with a notch $F^6$, with which engages a square portion or key $F^7$, fast on the barrel $F^3$, of the cable $F^2$. In this way a very simple and effective means is provided for connecting or disconnecting the apparatus with the wheels of the vehicle, and a nut $F^8$, is screwed over the end portion $F^4$, of the barrel $F^3$, so as to hold the latter in place.

On the shaft C rotatably journaled is a worm wheel $C^5$, which is in constant engagement with the worm F. The hub $C^6$, of this worm wheel carries a projection $C^7$, and adjacent to the wheel $C^5$, and slidingly arranged on the shaft C is a disk $C^8$, the hub $C^9$ of which extends normally over the hub $C^6$, of the worm wheel $C^5$, and is provided with a notch $C^{10}$, adapted to receive the projection $C^7$, thereby preventing the disk $C^8$, from rotating independently of the worm wheel $C^5$. The hub $C^9$, is moreover provided with a cavity $C^{11}$, in which lies a coil spring $C^{12}$, one end of which bears against the inner face of the cavity $C^{11}$, and the other against the inner face of the hub $C^6$, and which spring constantly tends to press the disk $C^8$, away from the worm wheel $C^5$.

Figure 10:
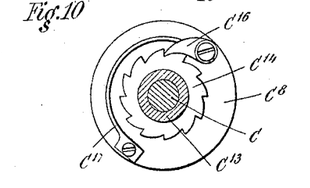
Fig. 10. is a section on the line 10—10 of Fig. 9., viewed in the direction of the arrows.

Adjacent to the disk $C^8$, and loosely surrounding the shaft C is a sleeve $C^{13}$, carrying on one end a ratchet wheel $C^{14}$, and adjacent to the latter a bevel wheel $C^{15}$. The teeth of the ratchet wheel $C^{14}$, are held in engagement with a pawl $C^{16}$, pivoted to the inner face of the disk $C^8$, and held in engagement with the ratchet $C^{14}$, by a spring $C^{17}$, (Fig. 10,) likewise attached to the same face of the disk $C^8$, whereby the ratchet wheel $C^{14}$, together with the sleeve $C^{13}$, is caused to rotate in the same direction as the disk $C^8$, driven by the worm wheel C. The opposite end of the sleeve $C^{13}$, carries a ratchet disk $C^{18}$, the outer face of which carries radially set bevel teeth $C^{19}$, which are in engagement with a spring or pawl $C^{20}$, attached to, and by preference lying in, a cavity $C^{21}$, of a disk $C^{22}$, which forms part of or is connected with a pinion $C^{23}$, loosely surrounding the shaft C and constantly meshing with an intermediate gear driven by the clockwork, which need not be further described. Both the teeth of the ratchet $C^{14}$, and those of the disk $C^{18}$, are so set, and the corresponding pawls $C^{16}$, $C^{20}$, are so arranged that the rotation of the sleeve $C^{13}$, can take place only in one direction corresponding to that of the worm wheel $C^5$, and of the pinion $C^{23}$, as will be readily perceived. The bevel wheel $C^{15}$, forming part of or fast on the sleeve $C^{13}$, constitutes the means by which the motion imparted either from the worm wheel $C^5$, or from the pinion $C^{23}$, is ultimately transmitted to the registering mechanism as will hereinafter be fully explained.

On the end of the shaft C, opposite to that which carries the worm wheel $C^5$, is securely mounted a bevel pinion $C^{24}$, which meshes with a bevel wheel G keyed or otherwise secured to a transverse shaft $G^1$, arranged for the control of the counting wheels of the registering mechanism so as to set the latter at initial fee when the shaft C is rotated by the knob D of the apparatus each time the mechanism is restored to initial position.

Figure 9:
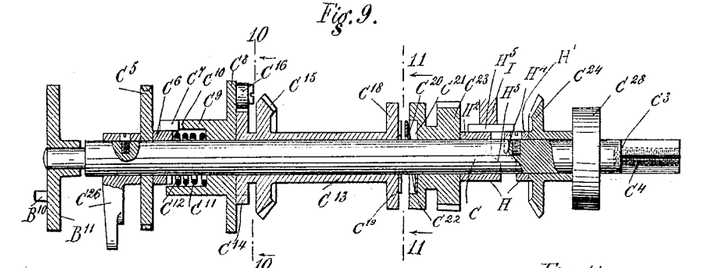
Fig. 9. is a longitudinal section of the gear and clutch arranged on and operating with the setting shaft of the apparatus.

Between the pinion $C^{23}$, and the bevel pinion $C^{24}$, is a clutch H consisting of two collars $H^1$, $H^2$. The collar $H^1$, is rigidly secured to the shaft C or constitutes part of the bevel pinion $C^{24}$. The other collar $H^2$, is loosely arranged on the shaft C, and capable of sliding thereon. It is provided with a beveled face or cam $H^3$, capable of engaging with a corresponding beveled face or cam $H^4$, of the fixed collar $H^1$, (Fig. 9.) Secured moreover to the movable collar $H^2$, is a lug $H^5$, which normally extends over the fixed collar $H^1$, and against which bears a detent or bracket I (Figs. 4 and 9) forming part of or attached to the frame work or housing.

Figures 12, 13:
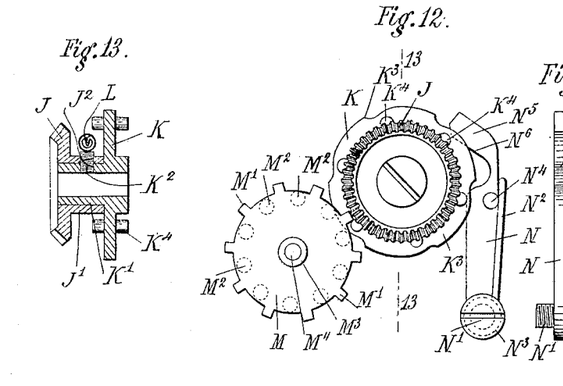
Fig. 12. shows in detail a front elevation of the toothed pin wheels and pawl of the transmission gear.
Fig. 13. is a section on the line 13—13 of Fig. 12.

The pinion $C^{23}$, which is constantly driven by the clockwork, drives, by means of the ratchet $C^{19}$, $C^{20}$, the sleeve $C^{13}$, and consequently the bevel wheel $C^{15}$, at a speed determined by the speed of the clockwork. This sleeve $C^{13}$, is also driven by the worm gear $C^5$, F, according to the speed of the vehicle, the driving in both cases taking place in one and the same direction owing to the arrangement of the ratchets $C^{19}$, $C^{20}$, and $C^{14}$, $C^{16}$, as has already been stated, and it is therefore that one of the two driving wheels $C^5$, $C^{23}$, which in the operation of the apparatus rotates at a higher speed, that ultimately drives the sleeve $C^{13}$, and with it the bevel gear $C^{15}$, which transmits the motion to the registering mechanism. The bevel gear $C^{15}$, is adapted to engage with a bevel pinion J when the apparatus is set for use. The bevel wheel J has a cylindrical hub $J^1$, which loosely surrounds the hub $K^1$, of a pin wheel K (Fig. 13) rotatably fitted on a stub shaft or pivot $K^3$, transversely secured in the framework. The hub $K^1$, of the pin wheel carries a radial pin $K^2$, and the hub $J^1$, is provided with a concentric notch $J^2$, through which the pin $K^2$, projects, and normally bears against one end of the notch.

Between the bevel wheel J and the pin wheel K is a traction or coil spring L, one end of which is attached to the inner face of the bevel wheel J, its other end being secured to the opposite face of the pin wheel K. This spring has a tendency to counteract the rotation of the pin wheel K imparted to it by the bevel wheel J, when the latter is driven by the bevel wheel $C^{15}$. The pin $K^2$, and the notch $J^2$, constitute a clutch by means of which the bevel pinion J and the pin wheel K are coupled when the pin has traveled to the end of the said notch opposite to that into which it projects in the initial position. Thus until the pin $K^2$, reaches said opposite end of the notch $J^2$, the bevel wheel J, on being driven by the bevel wheel $C^{15}$, turns loosely on the hub of the pin wheel K, which during that period remains stationary. As has already been stated the extent of the notch $J^2$, is such that the time during which the pin wheel K remains stationary and during which the registering mechanism is consequently idle, corresponds to the initial fee at which the apparatus has been set. Normally the bevel wheel J is out of engagement with the bevel wheel $C^{15}$, and it is brought into engagement with the latter under the influence of the clutch H by the setting, and out of engagement therewith by resetting the apparatus to its initial condition.

Figure 1:
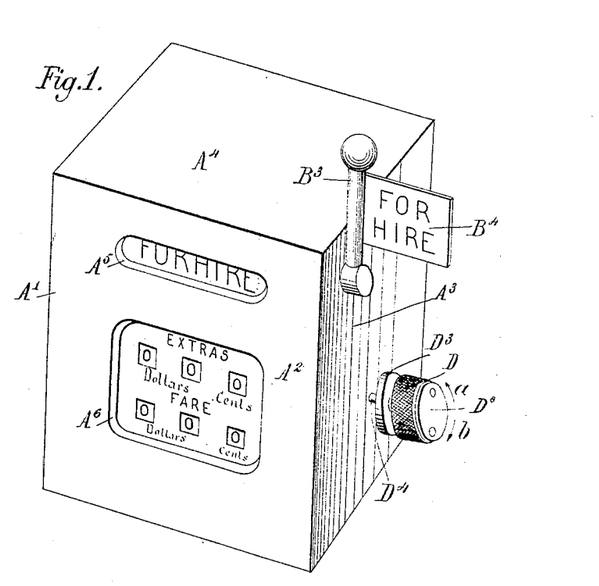
Figure 1. is a perspective view of the apparatus, as seen from the passenger's seat.
Figure 2:
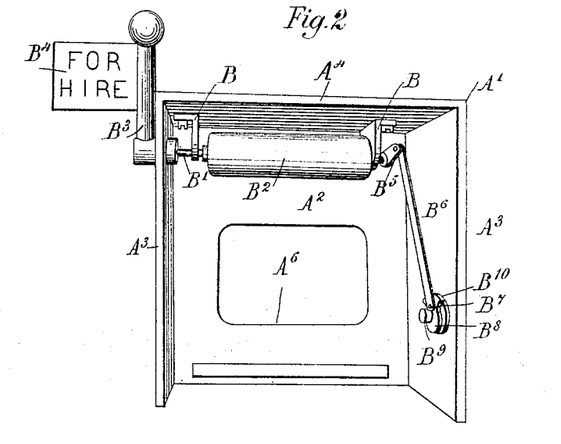
Fig. 2. is a perspective view of the interior of the upper part or cover of the housing, and showing the connecting rod and cam operated by the shaft of the mechanism and connected to the signboard or flag.
Figure 3:
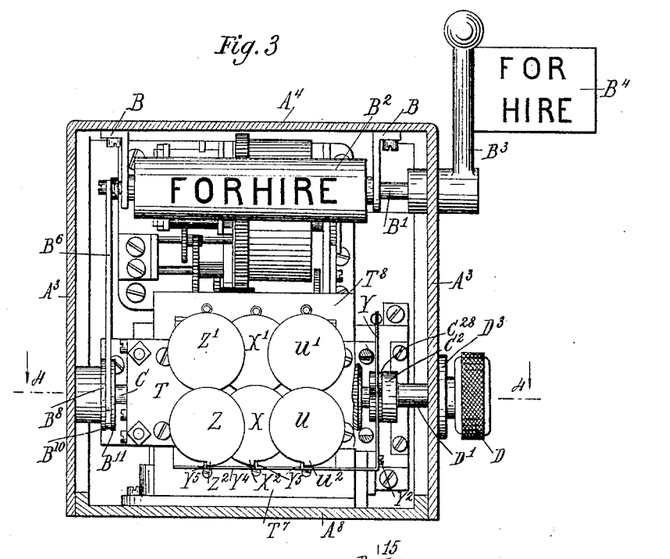
Fig. 3. is a front elevation of the mechanism showing the counting wheels, the clockwork and other parts as they appear on the removal of the front face of the housing.
Figure 4:
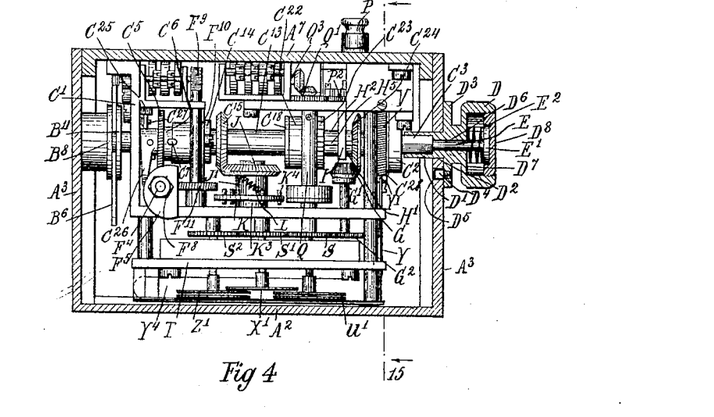
Fig. 4. is a section of the housing on the line 4—4 of Fig. 3. and showing a plan view of the mechanism.
Figure 5:
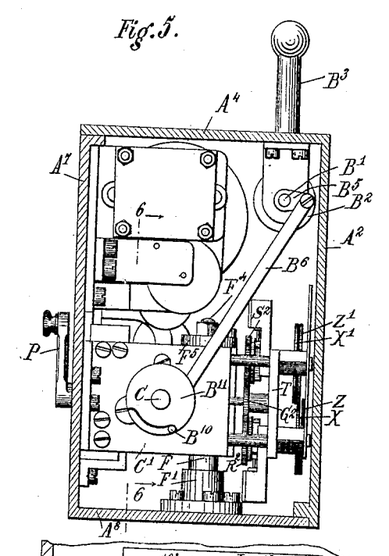
Fig. 5. is a lateral view of the parts shown in Fig. 3. upon the removal of the left hand side wall of the housing.

The operator in setting the apparatus turns the knob D in one direction (arrow $a$ Fig. 1.) whereby the movable clutch collar $H^2$, which is normally out of engagement with the collar $H^1$, is by such turning of the knob D and under the action of the spring $C^{12}$ (Fig. 9) moved towards and into engagement with the fixed collar $H^1$, or away from collar $H^1$, if the knob D is turned in opposite direction (arrow $b$ Fig. 1.) thereby either displacing the sleeve $C^{13}$, and the parts adjacent to the same, aided by the spring $C^{12}$, and throwing the bevel wheel $C^{15}$, into engagement with the bevel wheel J, or throwing these two pinions out of engagement, as will be clearly understood from the drawings. As shown in Fig. 4. a pin $C^{25}$, or other abutment is provided on the inner face of the bracket $C^1$, and extends into the path of an arm $C^{26}$, secured to the shaft C, whereby the rotary movement of the latter under the influence of the knob D is limited, when the mechanism is restored to initial position.

The pin wheel K is in engagement with a pin wheel M (Figs. 6 and 12), mounted on a sleeve $M^3$, extending to the shaft C of the apparatus. This pin wheel M carries a number of teeth $M^1$, on its circumference, and a corresponding number of pins $M^2$, which extend axially, one between each two adjacent teeth both ways and near the circumference of the wheel. The pin wheel K has also teeth $K^3$, on its circumference and axially projecting pins $K^4$, the number of which however is smaller than that of the teeth and pins of the wheel M, and the arrangement is such that the teeth $M^1$, of the pin wheel M are operated by the pins $K^4$, of the pin wheel K, while its pins $M^2$, coöperate with the teeth $K^3$, of the pin wheel K, and the wheels K and M have therefore a twofold engagement. The number of the teeth $K^3$, and that of the pins $K^4$, is, as has already been said, smaller than the number of the teeth $M^1$, and the pins $M^2$, on the wheel M, as the pins $K^4$, and the teeth $K^3$, are set at a greater distance from one another than the corresponding teeth and pins of the wheel M, and the engagement of the two wheels is therefore not continuous but periodical, the wheel M being at times completely free or out of engagement with the pin wheel K, but it is immovably held by the disk portions of the wheel K, which, in rotating, always lies with its circumference between two pins $M^2$, of the pinwheel M until each engagement is effected, as will clearly be seen from Fig. 12 of the drawings.

Figure 6:
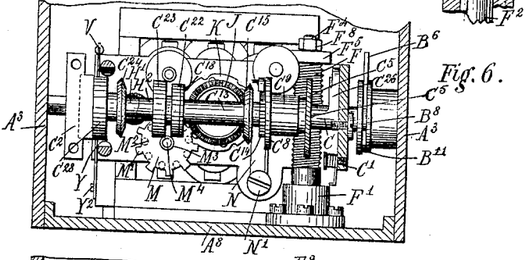
Fig. 6. is a section of the lower part of the housing on the line 6—6 of Fig. 5. viewed in the direction of the arrows.
Figure 11:
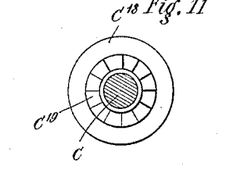
Fig. 11. is a section on line 11—11 of Fig. 9. looked at in the direction of the arrows.

The pin wheel M is fast on the sleeve $M^3$, which is slipped over a transverse shaft $M^4$, carrying the disk U which registers the units of the fare, the operative connection between the sleeve $M^3$, and the shaft $M^4$, being effected by a one way clutch or ratchet device similar to that designated by $C^{18}$, $C^{19}$, $C^{20}$, in Figs. 9 and 11. as described in connection with the sleeve $C^{13}$, and pinion $C^{23}$, arranged on the shaft C. The counting wheel X indicating the tens, and the counting wheel Z indicating the hundreds are geared together and to the units disk U, and are driven by the latter in any well known manner, or preferably by the mechanism illustrated in Fig. 16. which will be hereinafter explained. On the pin wheel M rotating, the shaft $M^4$, which carries the units disk U, receives a periodical and rotary movement of a certain amplitude, and at a speed imparted to that shaft $M^4$, by the pinwheel K, and the bevel pinion J from the worm wheel $C^5$, or by the pinion $C^{23}$, from the clockwork. As all these wheels rotate very slowly, the shaft $M^4$, and consequently the units disk U would accordingly be turned in a very slow manner. In order to obviate this inconvenience, and in order to effect, as is desirable, a swift change of the figures indicated by the units disk at the moment at which such figures are to be exposed to the passenger, the following mechanism has been provided:—Certain of the pins $K^4$, on the pin wheel K are constantly in contact with a pawl N, pivoted at $N^1$, as is shown in Fig. 6, to one of the intermediate brackets, and held against or in contact with the adjacent pins $K^4$, by a spring $N^2$, the lower end of which is wound on the shaft of the pivot $N^1$, and confined between one face of the pawl N, and the head $N^3$, of the pivot $N^1$, as indicated in Fig. 14, while its upper end bears against a lateral pin $N^4$, secured to the corresponding face of the pawl N. The spring $N^2$, presses the nose $N^5$, of said pawl constantly in one direction, whereas the pins $K^4$, of the pinwheel K periodically change the direction of their pressure with regard to said nose $N^5$, in such a manner that at the determined point of contact of each pin $K^4$, with the pawl N, the pressure of said pin supplements that of the nose $N^5$, instead of opposing it, whereby the pin wheel K receives, at this moment, a sudden quick rotary movement, which is aided by the pull of the spring L and is limited by the extent of a recess $N^6$, provided in the pawl N immediately below the edge of its nose $N^5$, as can be seen from Figs. 12 and 14, in the drawings. The pin wheel K has therefore two periods in its movements, one during which it moves slowly, and during which it opposes itself to the pressure exerted by the pawl N, and the other which is rapid and which takes place in conjunction with the pawl N and under the action of the spring L at the moment at which the pin wheel K actually operates the pin wheel M and the units wheel U whereby the change of the figures exposed by the latter is sudden and definite. It should be noted that the quick movement of the pawl N, does, in this action, not affect the bevel gear J, and therefore does not influence the bevel wheel $C^{10}$, owing to the provision of the notch $J^2$, in the hub $J^1$, of the gear J, as has heretofore been explained.

Figure 7:
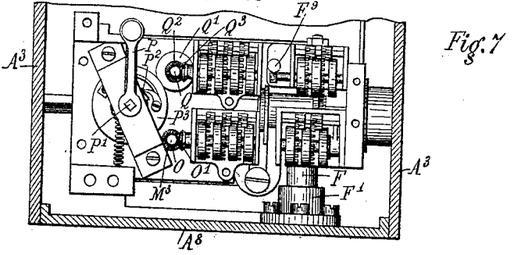
Fig. 7. is a rear view of the mechanism showing the crank for the adjustment of supplementary charges and the adding disks of the totalizer.

On the end of the shaft $M^4$, of the units wheel, which is driven by the pin wheel M, opposite to that which carries said units, wheel is mounted a bevel wheel O, (Fig. 7. meshing with a wheel $O^1$, carried by the shaft of the corresponding totalizer, which may be of any appropriate and known type.

In the present instance four such totalizers are provided, one recording the "units", or, for the present case, the "tens of cents", another the numbers of uses of the apparatus, the third the distance by kilometers or miles, and the fourth the total of the supplementary charges. Two sets of counting wheels are accordingly made use of, one serving for automatic indication, as already stated, and the other for the indication of supplementary charges, as will be presently described. Rotatably journaled in the rear wall $A^7$, of the housing, is a handle or crank P, which serves for the operation of the said second or upper set of counting wheels $U^1$, $X^1$, $Z^1$, for the purpose of indicating such supplementary charges for instance if the vehicle is hired at night time, or for a number of persons exceeding the average number allowed for the ordinary fee, or if in addition the vehicle is to carry heavy parcels or luggage. The shaft $P^1$, of the crank P carries, inside the casing, a ratchet wheel $P^2$, and it has a limited movement in one direction, being each time drawn back to its initial position by a spring or the like. As can be seen from Figs. 7 and 15, the ratchet wheel $P^2$, drives a pinion $P^3$, and the latter engages with a pinion $Q^1$, secured to the end of a transverse shaft Q which lies above and extends parallel to the shaft $M^3$, and is adapted to operate by means of a one way ratchet device, the upper units wheel $U^1$, of the supplementary set of the counting wheels.

Beyond the pinion $Q^1$, and mounted on the shaft Q is a bevel pinion $Q^2$, which engages with a bevel pinion $Q^3$, secured to the end of the shaft of the "supplementary" totalizer wheels, as can be seen from Fig. 7. of the drawings. The totalizer which records the automatic action of the mechanism is driven by a worm $F^9$, constituting one end of a transverse shaft $F^{10}$, the other end of which carries a worm gear $F^{11}$, which is in constant engagement with the worm F driven by the vehicle; as indicated in Fig. 4.

Figure 15:
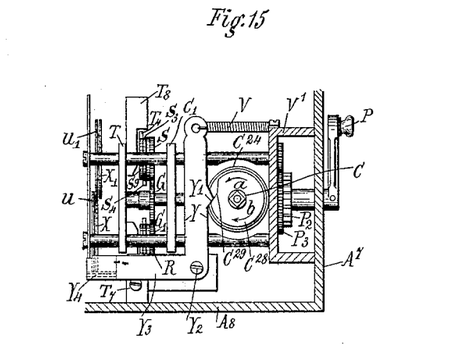
Figure 16:
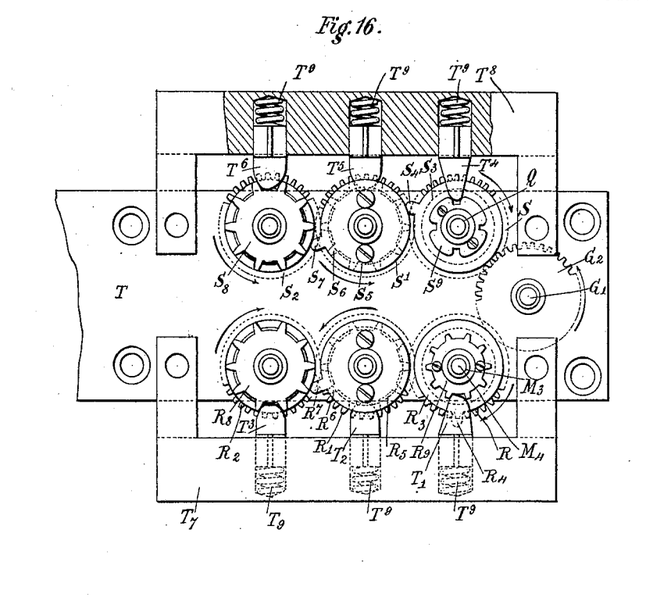

As has already been mentioned the operation of the counting wheels U, X, Z and $U^1$, $X^1$, $Z^1$, from the respective units wheels can take place in any known manner, but a preferable construction of an appropriate mechanism shall, by way of example, be described with reference to Figs. 15 and 16 of the drawings. The intermediate pinion $G^2$, which is provided for the simultaneous rotation of the units counting wheels when the shaft C is turned by the knob D in order to return the counting wheels to initial position, is so arranged as to engage both with the pinion R fixed on the shaft $M^4$, and with the pinion S fixed on the shaft Q of the upper units wheel $U^1$. Each of the pinions R, S, is loose on the shaft of the respective wheel, and drives the latter through a one way clutch. One part of this clutch is constituted by a cylindrical portion fast on the pinion and containing the pawl or feather arranged in a manner similar to that of the spring $C^{20}$, (Fig. 9.), and the other part of the clutch consists of a disk $R^3$, $S^3$, constructed such as for instance the disk $C^{18}$, in Fig. 11., or otherwise so as to be engaged by the adjacent clutch portion, if the latter is turned in one direction, and each disk $R^3$, $S^3$, is provided with a radial tooth, $R^4$, $S^4$, engaging with a toothed wheel $R^5$, $S^5$, on the shaft of the adjacent disk X, $X^1$, in such a manner that by each complete revolution of the shafts $M^4$, and Q each pinion $R^5$, $S^5$, is turned by the extent of one tooth, or in other words, by one unit, when the corresponding units wheel is turned to the extent of ten units. On the shafts of the counting wheels X, $X^1$, are secured similar disks, $R^6$, $S^6$, each provided with a radial tooth $R^7$, $S^7$, each adapted to turn a pinion $R^8$, $S^8$, secured to the corresponding shaft of each of the counting wheels Z, $Z^1$, denoting for instance the hundreds of units, which are thus turned by one tooth upon each complete revolution of the adjacent counting wheel X, $X^1$, in a well known manner. The shafts of the counting wheels are journaled at one end in a longitudinal extension of the bracket $C^1$, and at the other end in a bracket T arranged in the rear of the counting wheels, and the pinions $R^5$, $R^8$, $R^9$, and $S^5$, $S^8$, $S^9$, are controlled by a double set of pawls $T^1$, $T^2$, $T^3$, $T^4$, $T^5$, $T^6$, of which the first three are vertically guided in a lower bracket $T^7$, and the other in an upper bracket $T^8$, secured to the bracket T. Each of the pawls projects between two teeth of each of the said pinions $R^5$, $R^8$, $R^9$, $S^5$, $S^8$, $S^9$, into which position it is normally pressed by a spring $T^9$, the latter being interposed between the pawl and the bottom of the corresponding recess in which each pawl is guided in the brackets $T^7$, $T^8$. Each pinion is thus held immovable until it is engaged by the toothed disk of the adjacent counting wheel.

The arm $C^{26}$, at one end of the shaft C is adapted to coöperate with a spring actuated ratchet or lever, $C^{27}$, indicated in Fig. 4, which has for its object to operate the wheels of the adjacent totalizer when the mechanism is set for use, as is well known in apparatus of this kind. On the opposite end of the shaft C, and adjacent to the bracket portion $C^2$, in which said end of the shaft is journaled, is secured a cam $C^{28}$, and, as can clearly be seen from Fig. 15, this cam is provided with a circumferential recess $C^{29}$, adapted to engage with a projection or lug $Y^1$, of a bell crank lever Y, which is pivoted at $Y^2$, to a rearward extension of the bracket $T^7$. The upper end of the vertical arm of the lever Y is attached to a spring V to the upper end of a rear bracket $V^1$, or to the rear wall of the housing, the spring V tending to constantly draw the lever Y into engagement with the cam $C^{28}$. The horizontal arm $Y^3$, of said lever carries at its end a plate or bar $Y^4$, which extends parallel to the shaft C and lies below the lower set of counting wheels U, X, Z, as can clearly be seen from Figs. 3 and 4 of the drawing. Each of these lower counting wheels is provided with a tooth or notch $U^2$, $X^2$, $Z^2$, respectively, and the plate or horizontal arm $Y^4$, of the lever Y, carries on its upper face three projections or pins $Y^5$, which lie opposite the teeth $U^2$, $X^2$, $Z^2$, if the counting wheels are in initial position. The cam $C^{28}$, is so set on the shaft C that the projection $Y^1$, on the lever is held in the recess $C^{29}$, of the cam under the action of the spring V, when the shaft C has been turned by means of the knob D in the direction of the arrow $b$ (Figs. 1 and 15.) for the purpose of restoring the mechanism of the apparatus, and the counting wheels U, X, Z, to initial position, and in this position the lever Y is so held by the spring V that the plate $Y^4$, is elevated and consequently the pins $Y^5$, are held in engagement with the teeth $U^2$, $X^2$, $Z^2$, of said counting wheels in order to stop the latter precisely in the initial position and to prevent any likely overrunning of the wheels, as it may occur during their setting. On turning the shaft C in opposite direction (arrow $a$), the lever Y is rocked by the cam $C^{28}$, against the action of the spring V, whereby the pins $Y^5$, are thrown out of engagement with the counting wheels when the apparatus is set for use, as will be readily understood.

The operation of the described apparatus is as follows:—In the initial position of the apparatus the signboard $B^4$, is elevated, thereby indicating to the passenger that the vehicle is free for hire. This condition is by preference also indicated by the inscription on the roller $B^2$, and is visible through the slot $A^5$, of the housing. The pinion $C^{23}$, is at all times driven by the clockwork, and the worm gear $C^5$, rotates if the vehicle is in motion; but, as in the initial position, the clutch collars $H^1$, $H^2$, are out of engagement with one another, the transmitting pinion $C^{17}$, is out of engagement with the bevel wheel J, and the counting wheels are inoperative. If the vehicle is to be hired, the driver turns the knob D in the direction of the arrow $a$ (Fig. 1.) whereby the clutch collars $H^1$, $H^2$, are thrown into engagement with each other, and the sleeve $C^{13}$, carrying the bevel pinion $C^{15}$, is caused to move into the position shown in Fig. 4 of the drawings, in which the transmitting gear meshes with the pinion $C^{15}$, and is thus driven both by the clockwork which controls the rotation of the pinion $C^{23}$, and by the worm wheel $C^5$, which derives its rotation from the worm F from the vehicle, as above stated. By the same movement of the knob D the disk B¹¹, rocks the crank disk B¹⁰, and lowers the flag B⁴, to indicate that the vehicle is on hire. It should here be remembered that in so throwing the driving pinion C¹⁵, into engagement with the transmitting gear J, the position of the counting wheels is not interfered with, owing to the one way clutch, by means of which the pinions R, R¹, R², S, S¹, S², are coupled with the counting wheel shafts, and that only by rotation in one direction (arrow $b$ Fig. 1.) which corresponds to that ultimately imparted to the mechanism from the driving pinions C¹⁷, C²³, or to the turning of the knob D for re-setting purposes, are said counting wheels actually operated. The transmission gear J, K, M, is now in operation, but, as has already been explained, the pin wheel K remains idle until the pin K², has reached the extreme end of the notch J², during the rotation of the wheel J at the end of the time which corresponds to that allowed for the initial fee at which the apparatus has been set. This point being reached the pin wheel K begins to transmit the motion imparted to the bevel wheel J from the worm wheel C⁵, or from the pinion C²³, should the latter turn faster than the worm wheel C⁵, to the pin wheel M and through the shaft M⁴, to the unit disk U, which operates the adjacent counting wheel X at the end of each complete revolution, in the manner described. The mechanism in this way registers the amount due for the hire of the vehicle according to the time for which it has been hired. At the end of that time the driver turns the knob in the direction of arrow $b$ (Fig. 1.) whereby the registering mechanism is brought back to the initial position, with the counting wheels set at the initial fee, while the signboard B⁴, through the action of the crank disk B¹¹, and connecting rod B⁶, is elevated to indicate with the roller B², that the apparatus is again free for hire. At the same time the shaft C, by means of the arm C²⁶, operates the totalizer which accordingly records that hire of the vehicle.

From the foregoing description it will be seen that the construction of the apparatus is very simple and owing to the symmetrical arrangement of the various parts is very compact, and that all of such parts are so securely mounted within the casing that the latter may readily be opened without necessitating any dismounting or removal of the mechanism proper. The provision moreover of the movable sleeve on the setting shaft which carries the pinion by means of which the motion is transmitted, either from the clockwork or from the vehicle as described, and the means provided for the displacement of said sleeve, are features of construction by the presence of which the apparatus is considerably simplified, rendering special levers and the arrangement of separate gears, as hitherto used, entirely superfluous.

While I have described in the foregoing specification the construction of parts and operations preferred I am aware that numerous changes of construction may be made without departing from the spirit and scope of my invention, and I therefore do not wish to be understood as limiting myself by the positive terms employed in connection with the description, except such as the state of art may require.

What I claim as my invention, and desire to secure by Letters Patent is:—

1. The combination, in an automatic fare indicating apparatus, of driving mechanism, registering mechanism, a manually operated shaft for the setting of the driving mechanism to operative position, and for the setting of the registering mechanism to initial position by restoring the driving mechanism to normal position, with a member driven by the vehicle, and a member driven by the clockwork, means intermediate of said members for transmitting the motion from either driving member to the registering mechanism and a clutch operated by the setting shaft for the engagement or disengagement of said intermediate means with or from the device communicating the movement to the registering mechanism, all substantially as set forth.

2. In an automatic fare indicating apparatus, the combination of registering mechanism a manually operated rotary setting shaft with a pinion rotatable on said shaft and driven by the vehicle, a pinion driven by the clockwork and movably arranged on said shaft, a member intermediate of the two pinions, and axially movable on the setting shaft, and a one way ratchet interposed between said intermediate member and each of the two pinions, whereby movement from either of the pinions is imparted to the intermediate member in one direction only, and a clutch on the shaft and operated by the latter to throw the intermediate member into gear with the device communicating the movement to the registering mechanism by setting the shaft, and out of gear thereof by resetting the shaft for restoring purposes, substantially as described.

3. In an automatic fare indicating apparatus, the combination of a manually operated rotary setting shaft with a clutch, of which one part is securely fixed on the shaft and the other is movable in axial direction thereon, a fixed member or detent guiding said movable clutch member, and a spring on the shaft acting in opposition to the displacement in one direction of said movable clutch member, substantially as shown, and for the purpose specified.

4. In an automatic fare indicating apparatus, the combination of a sign board rotatably mounted on the outside of the apparatus, a manually operated rotary setting shaft with a member securely mounted at one end of the shaft, and means coöperating with said member, and connected with the signboard whereby the movement of the said shaft is communicated to the signboard, substantially as described, and for the purpose specified.

5. In an automatic fare indicating apparatus, the combination of a manually operated rotary setting shaft, with a cam fixed at the end thereof, a shaft journaled in a separate part of the housing, a signboard secured to one end of said shaft, a crank at the other end of the shaft, and a connecting rod attached at one end to said crank, and at the other to a cam coöperating with the cam on the setting shaft, all substantially as described.

6. In an automatic fare indicating apparatus, the combination with a manually operated rotary setting shaft, of a pinion fast thereon, and engaging with a pinion operating the gear of the counting wheels, and one way ratchets interposed between the driving pinions of said gear, and said counting wheels to operate the latter by rotation only in one direction, substantially as set forth.

7. In an automatic fare indicating apparatus, the combination of a manually operated rotary setting shaft, with a cam fast on the shaft, a member in constant engagement with said cam, and means operated by said member, and adapted to engage with the counting wheels in the movement of the setting shaft for adjusting the counting wheels at an initial position, substantially as described.

8. In an automatic fare indicating apparatus, the combination of the driving mechanism, as specified, with a transmitting gear interposed between said driving mechanism and the registering device, and having two toothed wheels provided with pins, the pins of one wheel engaging with the teeth of the other, the number of teeth and pins in one wheel being different from that of the pins and teeth of the other wheel, thereby producing a periodical double engagement, substantially as described.

9. In an automatic fare indicating apparatus, the combination with a manually operated rotary setting shaft of a transmitting gear, axially movable thereon, an idler to which movement is imparted by said gear from the vehicle or from the clockwork, a pin wheel constituting one of the members of the intermediate transmission gear, driven by said idler, and a clutch operatively coupling the pin wheel with the idler at a determined moment of the operation, substantially as described.

10. In an automatic fare indicating apparatus, the combination of the driving mechanism as specified with an idler having a hub loosely rotatable on the hub of the pin wheel to be driven by said idler, a circumferential groove in said hub of a determined length, a pin on the hub of the pin wheel engaging with said groove, and a spring attached at one end to the idler and at the other to the pin wheel, substantially as described, and for the purpose set forth.

11. In an automatic fare indicating apparatus, the combination of the driving mechanism as specified, of a pin wheel driven by said mechanism, a second pin wheel to which said motion is periodically imparted, a shaft carrying said second pin wheel, and rotatably arranged on the shaft of the units wheel, a one way clutch interposed between said two shafts to transmit the movement from said second pin wheel to the units wheel, all substantially as described, and for the purpose specified.

12. In an automatic fare indicating apparatus, the combination of the driving mechanism, as specified, with a pin wheel driven from said driving mechanism and a spring actuated pawl coöperating with the pins of said wheel in a manner to render the periods of engagement between the two pin wheels rapid and definite at determined intervals, substantially as described.

13. In an automatic fare indicating apparatus, the combination of a manually operated rotary setting shaft with the driving mechanism carried by said shaft, one set of counting wheels, and intermediate transmitting gear for automatically operating said counting wheels from the driving mechanism, a worm imparting movement to the driving mechanism, and a barrel or key for connecting said worm with the driving wheels of the vehicle, all substantially as set forth.

In testimony whereof I have signed my name to this specification in the presence of two subscribing witnesses.

ALFRED SEIMAN.

Witnesses:
R. H. BRANDON,
JUSTIN E. POLLAK.